Sept. 28, 1926.   1,601,443
J. HAVER
VEHICLE CURTAIN
Filed Sept. 15, 1922   3 Sheets-Sheet 1

Inventor
James Haver.
By
Attorneys

Sept. 28, 1926.  J. HAVER  1,601,443
VEHICLE CURTAIN
Filed Sept. 15, 1922    3 Sheets-Sheet 2
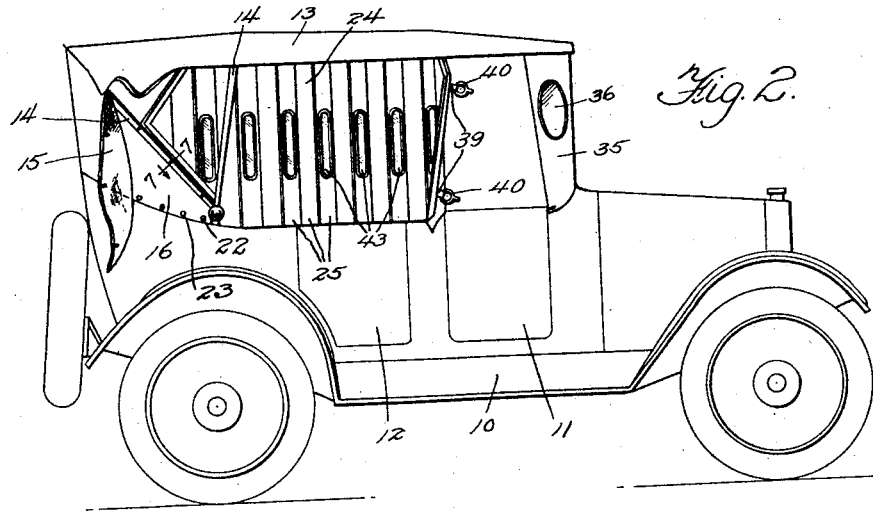
Fig. 2.
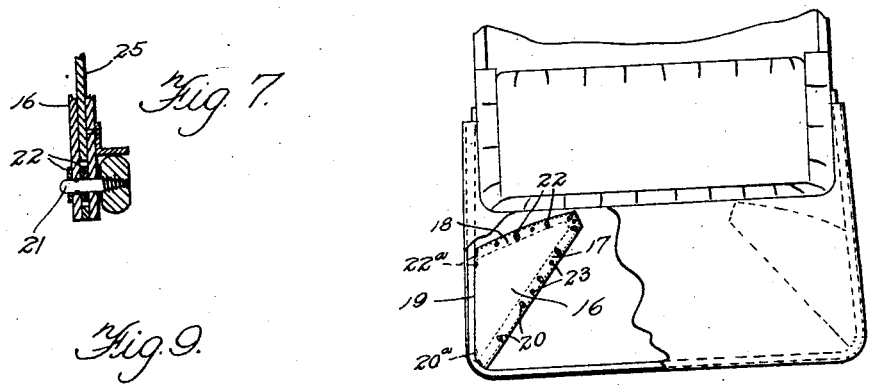
Fig. 7.
Fig. 9.
Fig. 10.
Fig. 8.
Inventor
James Haver.
By
Attorneys Sept. 28, 1926.  
J. HAVER  
VEHICLE CURTAIN  
Filed Sept. 15, 1922

Inventor  
James Haver.  
By  
Attorneys

Patented Sept. 28, 1926.

1,601,443

UNITED STATES PATENT OFFICE.

JAMES HAVER, OF VICKSBURG, MISSISSIPPI.

VEHICLE CURTAIN.

Application filed September 15, 1922. Serial No. 588,353.

My invention relates to a vehicle curtain and more particularly to a curtain so constructed as to facilitate the curtaining of the vehicle.

In the curtains now universally employed for vehicles, and particularly motor vehicles, difficulty is experienced in positioning the curtains and in removing the same, and furthermore in properly storing the curtains after they have been removed. Ofttimes such difficulty is experienced in properly positioning the curtains that they prove inefficient in properly sheltering the occupants of the vehicle from sudden downpours of rain.

It is therefore an important object of my invention to provide curtains for motor vehicles particularly, wherein the curtaining of the machine may be quickly and easily accomplished. Furthermore, my invention contemplates the provision of means for compactly and conveniently storing the curtains when not in use.

Another object of my invention is to provide means whereby heretofore unoccupied portions of the vehicle structure are utilized in storing the curtains when not in use, the storage receptacles at the same time being so constructed and disposed as to harmonize with the fittings of the vehicle and thereby not be unsightly in any respect.

Another object of my improved construction is that the receptacles containing the curtains may, when the top is collapsed, be conveniently folded and stored with the top, thereby eliminating any additional difficulty in this respect.

The various objects of my invention, as well as the novel combination, construction and arrangement of parts, will be made more apparent as the description proceeds, especially when considered in connection with the accompanying drawings wherein:

Fig. 2 is a similar view with the curtain partly collapsed, permitting the entrance or exit of a person into or from the machine;

Fig. 7 is an enlarged fragmentary section taken on the plane indicated by the line 7—7 in Fig. 2;

Fig. 8 is a detail view of the curtain receptacle;

Fig. 9 is an edge view thereof;

Fig. 10 is a fragmentary top plan view of the vehicle with the top folded back, indicating the position of the curtain receptacles; and, Fig. 11 is a similar view showing the curtain receptacles in a different position.

Figure 1:
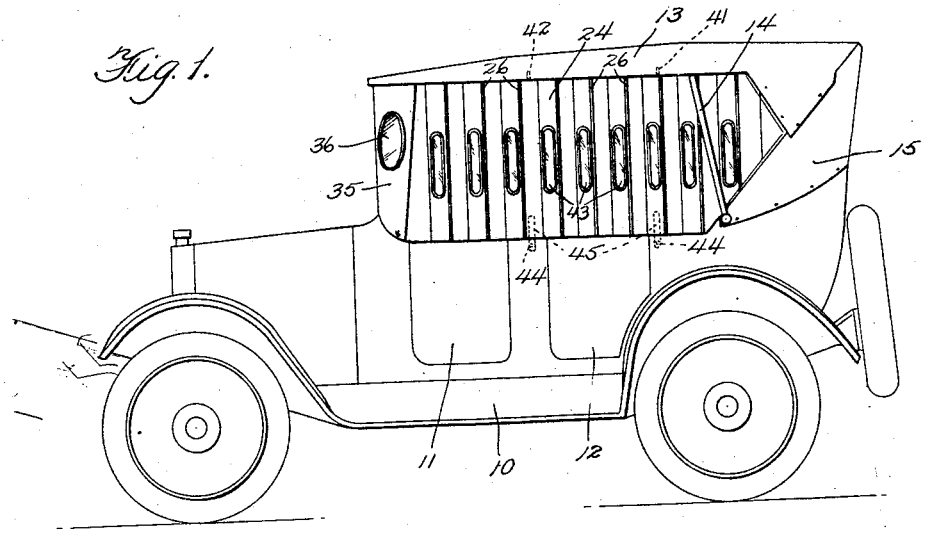
Figure 1 is a side elevation of a motor vehicle equipped with curtains constructed in accordance with my invention.

Referring now more particularly to the drawings wherein like reference characters indicate like parts, it will be noted that there is illustrated a motor vehicle 10 provided with front and rear doors, 11 and 12 respectively. A top 13 of usual construction is provided with supporting bows 14, two of which are shown in the drawings. In the type of vehicle illustrated the back curtain is provided with side flaps 15 which extend around the sides of the vehicle, and are secured to the diagonally disposed supporting bow 14.

In a vehicle of this construction, therefore, there is provided on the interior of the car and adjacent each angular side flap 15 a normally unoccupied space, and I therefore propose to secure the receptacles for housing my improved curtains in this space on the vehicle.

My improved curtain receptacle consists of a triangular-shaped pocket 16, (see particularly Fig. 8), which may be made of material similar to that of the vehicle top or of any suitable material having sufficient strength and durability. In cases where the vehicle top is not provided with the side flaps 15, the outer surface of the pockets or receptacles 16 may be made of water-proof material exactly similar to the top so as to harmonize therewith, inasmuch as in these cases the outer sides of these pockets will be exposed to view.

The pockets or receptacles consist of an outer member 17 and an inner member 18, united along one edge as at 19. Between these two members, 17 and 18, the collapsed or folded curtain, yet to be described, is adapted to be contained and completely housed. The two members 17 and 18, along one edge thereof, are provided with aligned apertures 20 adapted to co-operate with projections or pins 21 carried by the rearwardly inclined portions of the supporting bow 14.

The lower edge of each of the members, 17 and 18, is provided with similar apertures 22 adapted to co-operate with pins, similar to the pins 21, projecting from the body of the vehicle. In this manner the pockets may be removably secured in place and furthermore the inner member 18 of each pocket may be disengaged along two of its edges from the member 17, thereby opening the pocket to permit the removal or insertion of the folded curtains.

These fasteners just described may be of any suitable or preferred type, and in this present instance they are illustrated as the type of fastener known as the "lifter dot" fastener now universally employed in connection with automobile curtains.

By reference to Fig. 8 it will be noted that one of the fasteners denoted herein by the reference character 20$^a$ is disposed adjacent the top of the pocket 16 while another one of these fasteners 22$^a$ is disposed adjacent the lower rear end of the pocket. In describing the disposition of these pockets in the folding of the top, later to be referred to, the importance of these fasteners will be made more apparent.

Each pocket is provided with pairs of glove fasteners 23 disposed in the manner illustrated clearly in Fig. 8, which fasteners are caused to inter-engage to maintain the pocket in closed position when the pocket is disengaged from the supporting bow 14 and the body of the vehicle by disengaging the apertures 20 and 22 from their associated pins.

The curtain 24 for each side is accordion plaited and comprises a plurality of sections 25, each section being defined by a line of fold 26 and a line of stitching 27, these folds 26 extending in opposite directions so that the proper folding of the curtain 24 is assured when the same is moved to collapsed position.

The upper edge of the curtain 24 is provided with a plurality of eyelets 28 through which a wire cable or the like 29 is adapted to extend, thereby providing a support from which the curtain 24 is suspended. The rear end of this cable 29 is connected to a coil spring 30 which in turn is adapted to be secured to a hook 31 fastened to the supporting bow 14 on each side of the vehicle. The front end of this cable is adapted to removably engage a hook 32 projecting from the horizontally disposed top supporting bow 13$^a$.

The curtain is preferably secured within the pocket 16 by means of an extension or tab 33, removably connected thereto by fasteners 34.

Adjacent the windshield of the car at each side thereof there is provided rain curtains 35 which are secured in any known manner and provided with lights 36. These curtains may be left attached to the car, and when the main curtains 24 are brought into operative position these rain curtains lie outside the forward edge of the side curtains 24 and overlap the same. For securing the side or main curtains 24 in position there is provided a pair of straps 37 sewed or otherwise secured at their ends to the rain curtains 35, and carrying on their free ends rings 38. Straps 39, secured to the forward end of the main curtain 24, are provided with hooks 40 which engage the rings 38 for releasably securing the forward ends of the main curtain to the rain curtains.

Secured to one of the supporting bows 14 at each side thereof is a metal hook 41, while projecting from the horizontally disposed top supporting bow 13$^a$ at each side is another hook 42. These hooks are disposed immediately behind the rear and front doors, 12 and 11 respectively, and are adapted to engage the wire cable 29 to assist in supporting the same after the curtains have been moved to operative position. Obviously if it is desired to slide the curtains rearwardly so as to enter or leave by one of the front doors 11, then the curtains on one side may be moved backwardly until it engages the hook 42. When it is desired to slide the curtains backwardly sufficient to enable a person to leave by either of the back doors 12, then the wire cable 29 is entirely disengaged from the forwardly disposed hook 42 and the curtains thereby moved backwardly until they engage the rear hook 41. The purpose of these hooks is that of supporting the wire cable 29 either when the curtains are in place or when the curtains are folded to a collapsed position.

Each curtain 24 is provided with a plurality of lights 43 formed of isinglass, glass, or other suitable transparent material, and in this present instance every other section 25 is shown as provided with a light. However, obviously the number and arrangement of lights 43 may be varied as the design or occasion demands.

Disposed rearwardly of both the side doors, 11 and 12, and projecting from the body of the vehicle, are fasteners 44 adapted to be engaged by straps 45 secured to the lower edge of the curtain 24. Therefore in this manner the lower edge of the curtain may be firmly secured to the machine to prevent the same from being displaced relatively to the machine by wind or by vibration.

From the structure thus far described it will be immediately apparent that normally when the use of the curtains is not required the same may be moved rearwardly along their respective wire cables 29 and collapsed, because of the accordion plaited arrangement, to a compact condition, whereby they may be completely contained within the pockets 16.

Figure 3:
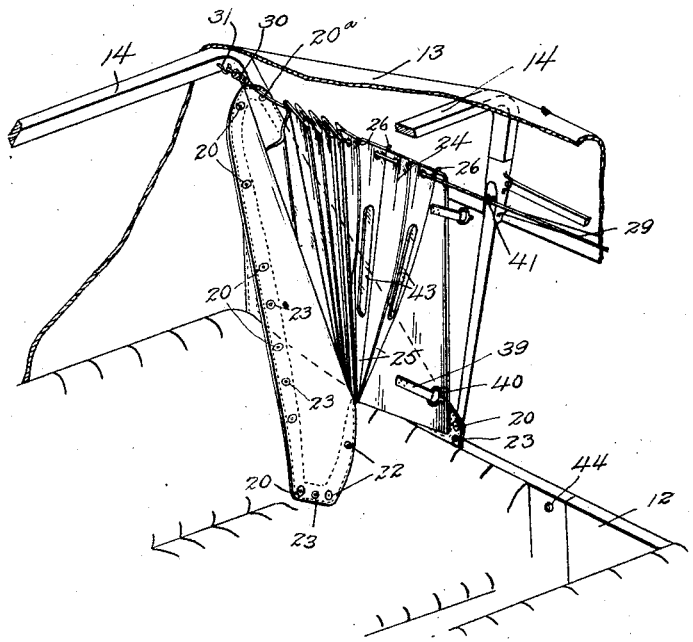
Fig. 3 is a fragmentary perspective view, partly in section, of the curtain container with the curtain partly removed therefrom.
Figure 6:
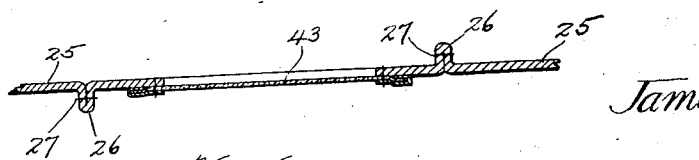
Fig. 6 is an enlarged fragmentary section taken on the plane indicated by the line 6—6 in Fig. 5.
Figure 4:
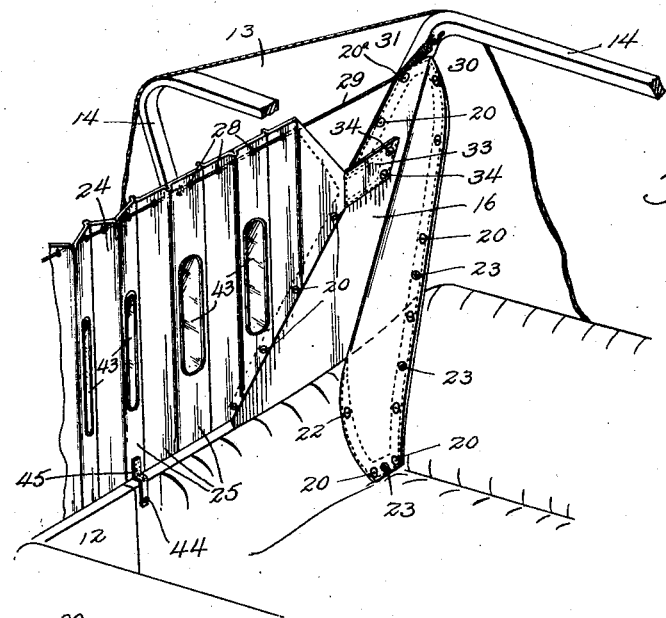
Fig. 4 is a fragmentary perspective view of a portion of the vehicle with the curtain in extended position.
Figure 5:
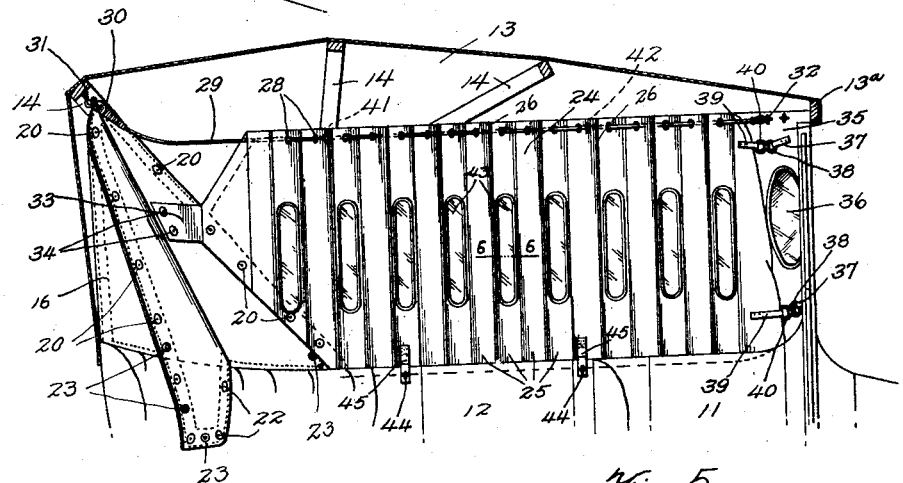
Fig. 5 is a longitudinal fragmentary section through the vehicle showing the curtains in place at one side thereof.

While collapsing the curtain 24 the pockets are opened by disengaging the fastening means 20 and 22 arranged along two of the edges of the pockets, the curtain just prior to being collapsed being illustrated in Fig. 3 of the drawings. After the curtain has been moved to a position within the pocket 16, the outer member 18 of the pocket is secuerd in place by the fasteners 20 and 22 and the curtain 24 is thereby completely concealed from view. In this instance the wire cables 29 are caused to engage the hooks 41 and 42 so as to maintain the same up close to the top of the vehicle. It should be noted that any slack in the cables 29 will be taken up by the coil springs 30 associated therewith.

Assume now, therefore, that it becomes desirable to immediately curtain the machine. In this event the pockets 16 are opened by disengaging the member 18 of each pocket from the member 17 and the curtain is slid along its associated cable 29 so as to close the open side of the vehicle. While the curtain is being moved along the cable 29, this cable is disengaged from its hooks 41 and 42. When the curtain has been completely unfolded the hooks 40 are caused to engage the rings 38 carried by the rain curtains adjacent the windshield. The wire cables are then caused to engage the hooks 41 and 42 and the straps 45 are caused to engage the fasteners 44 carried by the vehicle body. The vehicle is then completely enclosed and the occupants thereof sheltered from the inclemencies of the weather.

When it is desired to fold the vehicle top to a collapsed position it becomes necessary to partially, at least, disengage the pockets 16 from the position which they normally occupy while the top is raised.

Figure 11:
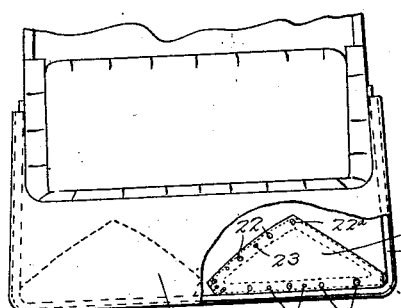

In some top constructions it is only necessary to disengage the fasteners 20 and 22, leaving secure fasteners 20ª and 22ª. When this is done the glove fasteners 23 carried by the sections 17 and 18 of each pocket are fastened, thus securing the pocket in closed position. The pockets are then swung backwardly against the back portion of the top, and when the top is thereafter collapsed and folded back the pocket 16 assumes the position illustrated in Fig. 10. However, in some top constructions it is necessary to disengage all but the fasteners 20ª arranged at the upper edges of each pocket, whereupon the pockets are swung to the position illustrated in Fig. 11 when the top is collapsed.

From the foregoing it will be immediately apparent that there is provided a curtain arrangement for motor vehicles by which the vehicle can be curtained with facility and the curtains conveniently stored without detracting from the finished and harmonious appearance of the vehicle. By positioning the pocket 16 in the manner herein described, a normally unoccupied space is utilized, and in many instances the necessity for the angular curtains sometimes employed adjacent the rear of the car is eliminated.

While one specific embodiment of the invention is described and illustrated herein, it is not intended that this invention be unnecessarily limited as regards the details, but reservation is hereby made to make such changes and modifications in the specific construction of the same as may come within the purview of the accompanying claims.

Having thus described my invention what I claim is:

1. The combination of a vehicle provided with a top and top supporting bow arranged adjacent the rear of the vehicle and defining with the top and vehicle body triangular spaces opposite the rear seat at each side, of a curtain arrangement including pockets detachably secured to said bow and vehicle and closing said triangular spaces, cables secured to the top of said vehicle, collapsible flexible curtains slidably suspended on said cables and adapted to close the open sides of the vehicle, said curtains being slidable along said cable into collapsed position within said pockets, said pockets being provided with means for securing the same in closed position, said pockets being adapted to be partially detached from said bow and vehicle body and folded with said top when the latter is lowered.

2. In an arrangement of the class described, the combination with a foldable vehicle top having a supporting bow forming with the top and vehicle body a triangular space adjacent the rear seat at each side, of collapsible curtains for closing the open sides of the vehicle, supporting cables extending along the top, said collapsible curtains being slidably mounted on said cables whereby they may be extended to operative position, and pockets for receiving said collapsible curtains, each of said pockets comprising a pair of triangular shaped sections joined together along one edge this edge being secured to the vehicle top, and means carried by the remaining two edges of each of said sections for detachably joining said edges together.

3. In an arrangement of the class described the combination with a vehicle top having a supporting bow forming with the top and foldable vehicle body a triangular space adjacent the rear seat at each side, of a curtain storage pocket arranged in said triangular space, said pocket comprising a pair of triangular shaped sections joined together along one edge, this edge being secured to the vehicle top, means carried by the remaining two edges of each of said sections for detachably joining said edges together and means carried by the vehicle body and by the said bow to detachably secure the last mentioned edges to the vehicle body and bow respectively.

In testimony whereof I affix my signature.

JAMES HAVER.